F. D. NEWBURY.
Revolver.
No 204. A. I. Patented Sept. 28, 1858.
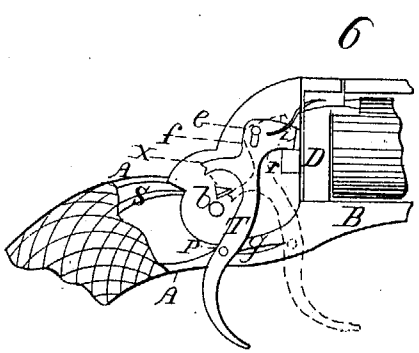
6
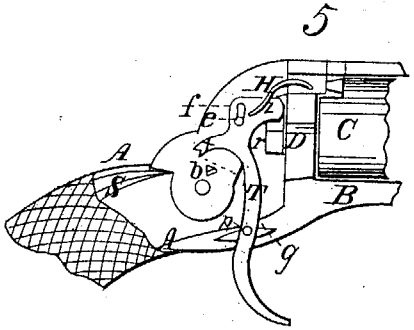
5
Witnesses
Richd Lamb
E. Mills
Inventor
F. D. Newbury
N. PETERS, PHOTO-LITHOGRAPHER, WASHINGTON, D. C.

UNITED STATES PATENT OFFICE.

FREDERICK D. NEWBURY, OF ALBANY, NEW YORK.

IMPROVEMENT IN REVOLVING FIRE-ARMS.

Specification forming part of Letters Patent No. 20,765, dated June 29, 1858; Additional Improvement No. 204, dated September 28, 1858.

*To all whom it may concern:*

Be it known that I, FREDERICK D. NEWBURY, of the city of Albany, State of New York, have invented an improvement upon my Improvement in the Construction of Fire-Arms, (for which Letters Patent of the United States were issued to me as assignor to Richard Varick DeWitt, Jr., on the 20th of June, A. D. 1858;) and I declare the following specification, with the drawings attached hereto as part of the same, to be a full description thereof.

The figures are numbered 5 and 6 in continuation of those of the original patent, and are lettered to correspond with them. By reference to said Letters Patent, in the twenty-eighth, twenty-ninth, thirtieth, and thirty-first lines of the specification a certain part of the operation of the trigger is thus described:

"The piece being fired and the trigger released, it (the trigger) is thrown forward by a spring, *z*, when the limb *x* passes down over the pin *b*, the end of the pin being beveled with an upward slope and the end of the limb beveled with a downward slope to permit the easy passage of the one over the other, aided by the elasticity of the trigger, and the parts take their place, as in Figure 1."

My improvement is to effect the return of the trigger and its passage past the pin *b* by a different and better mode, as shown by Figs. 5 and 6.

The trigger, as shown in the original patent, is centered upon the pin *e*, turning upon it as its fixed center of motion. In my improvement, instead of this pin passing through a cylindrical hole in the trigger, the hole is elongated into a slot, *f*, in order that the trigger may move upward sufficiently far upon the pin so as to change its center of motion, so as to make the arc described by the point of the limb *x* pass above the pin *b* upon the hammer, instead of passing by a sideling movement over the end thereof, as shown in the original patent.

In order to guide the trigger in its movements, there is placed in the lower part of the frame, on one side of the slot in which the trigger moves, a feather, *g*, shaped for the guidance of a pin, *p*, which projects from the side of the trigger, by means of which, whenever the trigger is drawn backward, the pin, sliding along the lower edge of the feather, holds it down so as to make it turn upon the upper part of the slot *f*, to which also the pressure of the limb *x* under the pin *b* also tends; but as soon as the trigger commences its forward movement after the disengagement of the hammer, then the pin *p* passes up and along the upward edge of the feather, compelling the trigger to turn in the lower part of the slot, so that the end of limb *x* can pass clear of pin *b*, as shown by the dotted lines in Fig. 5.

The advantages of this mode of construction over the one described in the patent are that it permits the use of a narrow slot in the lower bar of the stock-frame, just large enough for the free back and front movements of the trigger, instead of a wide opening to permit of the lateral movement of the trigger in order to pass over the end of pin *b*; also, that by the feather and pin the proper movements of the trigger to pass *x* above the pin *b* and place it in position for the next operation of the piece are rendered certain.

What I claim, and desire to secure by Letters Patent, is—

In the construction and use of the trigger, the slot *f*, also the feather *g*, with the pin *p*, substantially as described, and for the purposes set forth in the within specification.

F. D. NEWBURY.

Witnesses:

RICHD. VARICK DE WITT,

E. J. MILLER.